US006823506B1

(12) United States Patent
Whitten (10) Patent No.: US 6,823,506 B1
(45) Date of Patent: *Nov. 23, 2004

(54) METAFILE OPTIMIZATION (75) Inventor: Gordon T. Whitten, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/271,928

(22) Filed: Mar. 17, 1999

Related U.S. Application Data

(63) Continuation of application No. 08/549,376, filed on Oct. 27, 1995, now Pat. No. 5,987,257.

(51) Int. Cl.[7] .................................................. G06F 9/45
(52) U.S. Cl. ........................ 717/151; 717/158; 717/159
(58) Field of Search .............................. 705/1; 717/144, 717/162, 142, 151–159; 709/330

(56) References Cited

U.S. PATENT DOCUMENTS 5,504,901 A * 4/1996 Peterson
5,603,034 A * 2/1997 Swanson
5,652,887 A * 7/1997 Dewey
5,987,257 A * 11/1999 Whitten

* cited by examiner

Primary Examiner—Frantzy Poinvil
(74) Attorney, Agent, or Firm—Lee & Hayes, PLLC (57) ABSTRACT

The specification describes a program used to optimize journal files such as metafiles used in the Microsoft® Windows® programming environment. The program steps through instructions from the original journal file and selectively emits the instructions to an optimized metafile using several optimization techniques. One such technique is to defer the emission of any state modification instruction until such emission is actually required by a subsequent instruction that is dependent on the state modification instruction. For instance, resource creation and selection instructions are not emitted until the specified resource is actually used. Another technique is to indefinitely defer the emission of any state modification instruction that would merely duplicate the currently existing effect of previously emitted state modification instructions. A further technique is to indefinitely defer the emission of resource deletion instructions, and to re-use existing resources rather than creating a new resource prior to every resource usage instruction.

6 Claims, 5 Drawing Sheets

METAFILE OPTIMIZATION

RELATED APPLICATIONS

This is a continuation of U.S. patent application Ser. No. 08/549,376, filed Oct. 27, 1995, which is now U.S. Pat. No. 5,987,257.

TECHNICAL FIELD

This invention relates generally to computer-implemented methods for optimizing instruction sequences involving creation, selection, use, and deletion of dynamically created computer resources. More specifically, the invention relates to methods for optimizing instruction files, known as journal files or metafiles, used in conjunction with Microsoft Windows® graphics display interfaces.

BACKGROUND OF THE INVENTION

Graphical output under the Microsoft Windows 3.x® and Windows NT® operating systems is generally accomplished through calls to operating system functions. The operating system components used for carrying out graphics instructions are collectively referred to as the graphic device interface or GDI.

The Windows® GDI uses dynamically created objects or resources for carrying out drawing operations. Resources are classified into four different categories or classes: pens, brushes, palettes and fonts. One resource from each class can be currently selected at any given time. Different GDI resources are used to perform various types of drawing operations.

In general, resource-related GDI functions or instructions can be categorized as resource creation instructions, resource selection instructions, resource usage instructions, and resource deletion instructions. Before a resource is used it must be created with a resource creation instruction. It must then be selected using a resource selection instruction. Resource usage instructions are used to draw shapes with whatever resource has most recently been selected with a resource selection instruction. After use, resources are deleted with resource deletion instructions.

Resource usage instructions can be used to form a variety of shapes or images, such as lines, arcs, regions, ellipses, polygons, rectangles, and bitmaps. Drawing a straight line is an example of a simple operation that can be performed with GDI instructions. To draw a line, a pen is created, selected, used, and then deleted. This involves four different instructions or GDI function calls: CREATEPEN, SELECTOBJECT, LINETO, and DELETEOBJECT.

Some GDI instructions are dependent on previous instructions. For instance, resource selection instructions are dependent on previously issued resource creation instructions—before a resource can be selected it must be created. Similarly, resource usage instructions are dependent on previously issued resource creation and selection instructions—before a resource can be used it must be both created and selected.

Many GDI operations are also dependent on computer-maintained state information such as existing resources and their attributes, and graphics modes. State information includes such things as aspect ratio, pixel origin, background color, display mode, text color, text alignment, window origins, color adjustment, direction of polygon filling, view scaling, clipping, etc. In this discussion, state information also includes the identification of currently selected resources.

The combination of all current state information is referred to as a state context. The Windows® GDI maintains a context stack. The current state context can be pushed onto or popped from the stack. This provides an easy way for an application program to perform GDI operations without permanently changing the state context.

In addition to providing a convenient way to create device-independent graphics images, the Windows® GDI can be used to create data files for storing such images. Rather than storing the images in bit-mapped format, they are stored as an ordered sequence of GDI instructions which are "played" to create an actual display image. The Windows® GDI contains functions for recording and storing GDI instructions in such files, which are referred to in the Windows® environment as "metafiles." A metafile is simply a collection of GDI commands that creates desired text or images. Because metafiles take up less space and are more device-independent than bitmaps, they provide convenient storage for images that appear repeatedly in an application or need to be moved from one application to another.

To generate a metafile, a Windows® application creates a special device context that sends GDI commands to a metafile for storage. The application can later play back the metafile and display the image. During playback, the GDI breaks the metafile down into records, each containing an instruction, and identifies each created resource with an object index value that indexes a handle table. After a DELETEOBJECT instruction is encountered during playback, the associated object index value is re-used by the next resource that the metafile creates.

A metafile consists of two pertinent parts: a header and a list of records. The header contains a description of the size of the metafile, the number of drawing resources it uses, and other information. Each metafile record contains a header, a GDI instruction, and its arguments.

GDI functions and metafiles will be familiar to those accustomed to programming in the Windows® environment. For more information regarding these subjects, refer to the Windows 3.1® and Windows NT® Programing Manuals, available from Microsoft Corporation of Redmond, Wash. Both of these references are hereby incorporated by reference.

While metafiles offer an attractive alternative to bit-mapped files, further size reduction would be welcomed—particularly in the context of newer consumer-oriented applications which attempt to utilize graphical user interfaces to a degree that has previously not been attempted. The invention described below meets this need by reducing the number of records or instructions in metafiles. In addition, the methods described below result in optimized metafiles which can be played back more quickly than the original, non-optimized metafiles.

SUMMARY OF THE INVENTION

This invention is a method for optimizing metafiles. In the preferred embodiment, an optimization program reads instructions sequentially from an original metafile. The records are filtered and in some cases rearranged, and emitted to an optimized metafile. The optimized metafile, when played back, results in the same image as the original metafile. However, there are comparatively fewer records and instructions in the optimized metafile than in the original metafile.

The optimization program uses several methods to achieve optimization. One such method is to defer emission of any given instruction until such emission is actually necessary. For instance, a resource selection instruction that selects a particular resource is not emitted to the optimized metafile until the optimization program encounters a subsequent resource usage instruction in the original metafile that attempts to use the same resource. In many cases this results in indefinitely deferring the resource selection instruction, thereby reducing the number of emitted instructions. Another method is to skip or omit the emission of any state modification instruction (including resource selection instructions) that would not result in a change to current state information.

These situations happen more frequently than might be thought, because of the tendency for programs to perform drawing operations using self-contained sequences of instructions. For example, a particular application program function might be responsible for drawing a circle at supplied coordinates. Because the function might be called from a multitude of other program locations, the function cannot make any assumptions about current state information or selected resources. Rather, the function must set any necessary state information upon to which drawing operations might be dependent—in spite of the fact that the appropriate state information might already be set.

Another method used in the preferred embodiment of the invention is to avoid destroying any resources until metafile playback is complete. Rather, resources are left in existence for subsequent use. Upon encountering a new resource creation instruction in the original metafile, the optimization program compares the characteristics of the new resource against characteristics of resources already in existence. If a match is found, a previously created resource is used and the new resource creation instruction is not emitted. This again results in fewer instruction emissions, thereby reducing the metafile size and speeding playback of the metafile.

DETAILED DESCRIPTION OF THE PREFERRED EMBODIMENT

Figure 1:
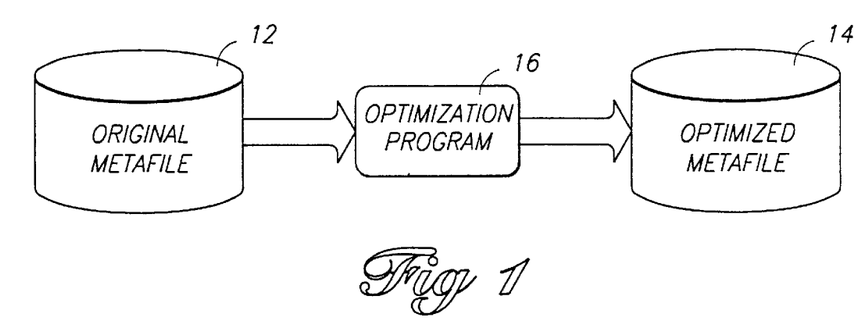
FIG. 1 is a block diagram showing the process of optimizing a metafile in accordance with a preferred embodiment of the invention.

FIG. 1 shows the general computer-implemented process of converting an original journal file or metafile 12 to an optimized journal file or metafile 14 using an optimization program 16. Original metafile 12 contains a sequence of records or GDI instructions in a standard Windows 3.x® or Windows NT® format.

Optimization program 16 processes the instructions of original metafile 12 in the order of their occurrence within original metafile 12., as they would be processed by the Windows® GDI. In other words, it steps through the instructions so that they are encountered in their original order. Optimized metafile 14 is created by emitting selected ones of the instructions from the original metafile 12. Some instructions are emitted as they are encountered; some have deferred emission; some are emitted only after emitting previously deferred instructions; and some are never emitted.

The following discussion is concerned primarily with the creation of an ordered and optimized output stream of instructions based on the original metafile. Optimization program 16 accepts an original ordered sequence of instructions and emits an optimized ordered sequence of instructions. In the preferred embodiment, optimization program 16 is intended to optimize original metafiles that have already been created by other application programs. The optimized instruction sequence in such an environment is emitted to a non-volatile computer-readable storage medium such as a hard disk, creating a data structure or file having the optimized instruction sequence. In this case, the optimization program also updates any pertinent metafile header information to maintain compatibility with the Windows® GDI system.

Rather than emitting to a computer file system, it might be desirable in some situations to perform on-the-fly or real-time optimization. For instance, this might be useful when transmitting metafiles over relatively slow transmission media such as telephone lines. In this case, the optimized instruction sequence would be immediately transmitted rather than being stored.

The instructions contained in metafiles 12 and 14 are members of the Windows® GDI or metafile instruction set, used as described above in conjunction with dynamically created computer resources or GDI objects. The instruction set includes different types of instructions, each used to accomplish a specific result. Instructions of a given type differ from each other only in their arguments. For instance, SELECTOBJECT is one type of instruction. This instruction can be used with different arguments to select different resources. DELETEOBJECT is another type of instruction that can be used with different arguments to delete specified resources.

The instruction set includes state-related instructions. More specifically, certain types of instructions referred to as state-dependent instructions are dependent for their intended operation on state information or variables maintained by the Windows® GDI. Other types of instructions referred to as state modification instructions are used to set or modify state information. The Windows® GDI LINETO instruction is an example of a state-dependent instruction. SETBKCOLOR is an example of a state modification instruction from the Windows® instruction set.

Different types of state modification instructions apply to different state information or variables maintained by the Windows® GDI. Some state modification instructions apply to single state variables and do not interfere with the results of other state modification instructions. The following first group of state modification instructions in the Windows NT® environment are considered to fall within this category: SETWINDOWEXTEX, SETWINDOWORGEX, SETVIEWPORTEXTEX, SETVIEWPORTORGEX, SETBRUSHORGEX, EOF, SETMAPPERFLAGS, SETMAPMODE, SETBKMOD, SETPOLYFILLMODE, SETROP2, SETSTRETCHBLTMODE, SETTEXTALIGN, SETCOLORADJUSTMENT, SETTEXTCOLOR, SETBKCOLOR, SETMETARGN, SETARCDIRECTION, SETMITERLIMIT.

Other types of state modification instructions have effects that are more general, and interact with settings established by other instructions. Such instructions include the following second group: OFFSETCLIPRGN, EXCLUDECLIPRECT, INTERSECTCLIPRECT, SCALEVIEWPORTEXTEX, SCALEWINDOWEXTEX, SAVEDC, RESTOREDC, SETWORLDTRANSFORM, MODIFYWORLDTRANSFORM, and EXTSELECTCLIPRGN.

Still other types of state modification instructions are classified as "unknown." These are instructions having affects which are not known to optimization program 16. The following instructions are classified as unknown in the preferred embodiment of the invention: SETPALETTEENTRIES, RESIZEPALETTE, REALIZEPALETTE, BEGINPATH, ENDPATH, CLOSEFIGURE, FILLPATH, STROKEANDFILLPATH, STROKEPATH, FLATTENPATH, WIDENPATH, SELECTCLIPPATH, ABORTPATH, FRAMERGN, INVERTRGN, PAINTRGN, MASKBLT, PLGBLT, and SETDIBITSTODEVICE. In addition, any other instruction that is not recognized by optimization program 16 is classified as unknown.

The second group of state modification instructions together with the unknown instructions are referred to as "special" instructions in the following discussion. The results or effects of these instructions are difficult to predict. Thus, they receive special handling by optimization program 16.

The instruction set further includes resource-related instructions, including resource creation instructions, resource selection instructions, resource usage instructions, and resource deletion instructions.

A resource creation instruction is used to create a resource. A resource creation instruction specifies desired characteristics of the resource such as perhaps color or size parameters. Under normal operation, a created resource is assigned an object index value and is subsequently referenced by the assigned object index value.

Resource creation instructions under Windows NT® include: CREATEBRUSHINDIRECT, CREATEDIBPATTERNBRUSHINDIRECT, CREATEMONOBRUSH, CREATEPALETTE, CREATEPEN, and CREATEFONTINDIRECTW.

Resource selection instructions are used to make a particular resource of a particular type current for use by subsequent resource usage instructions. Resource selection instructions specify created resources by their assigned object index values.

Resource selection instructions include the SELECTPALETTE and SELECTOBJECT instructions. SELECTPALETTE is used to select palettes, while SELECTOBJECT is used to select the other resource types.

Under the Windows® GDI, there are four different classes of resources: pens, brushes, fonts, and palettes. A resource is made active or current by a resource selection instruction. One created resource of each class can be active or current at any given point during playback of a metafile. Selecting an active resource of one class does not affect a previous selection of a resource of a different class. For example, selecting a particular pen resource does not affect a previous selection of a brush resource. For purposes of this description, the currently selected or active resource within each class is considered to be state information. Accordingly, resource selection instructions are considered state modification instructions.

Resource usage instructions utilize currently active resources to accomplish drawing tasks. Resource usage instructions are state-dependent and include the following GDI instructions: ANGLEARC, ARC, ARCTO, BITBLT, CHORD, ELLIPSE, EXTFLOODFILL, EXTTEXTOUTA, EXTTEXTOUTW, FILLRGN, LINETO, MOVETOEX; PIE, POLYBEZIER, POLYBEZIER16, POLYBEZIERTO, POLYBEZIERTO16, POLYDRAW, POLYDRAW16, POLYGON, POLYGON16, POLYLINE, POLYLINE16, POLYLINETO, POLYLINETO16, POLYPOLYGON, POLYPOLYGON16, POLYPOLYLINE, POLYPOLYLINE16, POLYTEXTOUTA, POLYTEXTOUTW, RECTANGLE, ROUNDRECT, SETPIXELV, STRETCHBLT, STRETCHDIBITS.

Optimization program 16 keeps track of the most recently encountered and the most recently emitted state modification instructions applying to the respective state variables or different types of state information. It does this by maintaining two instruction reports. An "original" instruction report identifies the most recently encountered instruction of each type (from the original metafile). An "emitted" instruction report identifies the most recently emitted instruction of each type. Of primary concern in these reports are state modification instruction types—types of instructions that apply to or modify state information or variables.

Upon encountering a particular state modification instruction, optimization program 16 updates the original instruction report to identify that particular state modification instruction as being the most recently encountered instruction of its type. Likewise, upon emitting a particular state modification instruction, optimization program 16 updates the emitted instruction report to identify that particular state modification instruction as being the most recently emitted instruction of its type. In the preferred embodiment discussed herein, a single type of instruction will vary only in its parameters or arguments. For instance, SETBKMODE is a particular type of state modification instruction having varying arguments. Accordingly, it might only be necessary, for each type of instruction, to record the arguments of the most recently encountered or emitted instruction of that type. Alternatively, it might be convenient to record the entire instruction, including the instruction's keyword ("SETBKMODE" in this case).

The instruction reports are used to allow optimization program 16 to determine state information both as it is intended to be at the current point in the playback of the original metafile and as it will be at the corresponding point in the playback of the optimized metafile.

The SELECTOBJECT instruction type is handled as a special case. A SELECTOBJECT instruction can apply to one of three different resource classes as already described. Optimization program 16 records, for instructions of the SELECTOBJECT type, the most recently encountered and emitted instructions applying to each of the different resource classes. This allows program 16 to determine which resource is intended to be active for each class at any point during playback of the original metafile, and which resource is actually active for each class at any point during playback of the optimized metafile.

Upon encountering a state modification instruction applying to particular state information, optimization program 16 defers emission of the state modification instruction at least until encountering a subsequent instruction that is dependent on the particular state information. Alternatively stated, a state modification instruction is subsequently emitted if and only if a subsequently encountered instruction is dependent on the state modification instruction.

For example, upon encountering any particular resource creation instruction, its emission is deferred at least until encountering a resource selection instruction that is dependent on the particular resource creation instruction. Similarly, upon encountering any particular resource selection instruction, its emission is deferred at least until encountering a particular resource usage instruction that is dependent on the particular resource selection instruction.

A further step is performed, however, to eliminate emission of duplicative state modification instructions. Generally stated, before emitting any state modification instruction it is compared to the most recently emitted state modification instruction of the same type or resource class. If the two instructions are identical, the state modification instruction is not emitted. As an example, suppose that a resource usage instruction is encountered that is dependent on a particular resource selection instruction. In accordance with the invention, the particular resource selection instruction is to be emitted if and only if it differs from the most recently emitted resource selection instruction applying to the same resource class.

In practice, this comparison is accomplished by using the instruction reports described above. Upon encountering any state-dependent instruction, program 16 determines which types of state modification instructions the state-dependent instruction is dependent upon. For each of these identified instruction types, the program Compares the most recently emitted instruction of the type with the most recently encountered instruction of the same type. As a result of the comparison, optimization program 16 emits the most recently encountered instruction of the type if and only if it differs from the most recently emitted instruction of the type.

A further optimization measure involves re-using previously-created resources rather than creating a new resource for each drawing operation. A first step performed by optimization program 16 to accomplish this step comprises indefinitely deferring emission of resource deletion instructions. Resource deletion instructions are simply ignored and not emitted (at least until the end of the emitted metafile). Another step comprises indefinitely deferring emission of a resource creation instruction if it specifies resource characteristics identical to those of a previously emitted resource creation instruction, provided no resource deletion instruction was emitted for that resource subsequent to the previously emitted resource creation instruction and prior to the current resource creation record. Finally, upon encountering a particular resource selection instruction that specifies a resource identifier or object index value that is the same as an indefinitely deferred resource creation instruction, program 16 changes the resource selection instruction to specify the same resource identifier as a previously emitted and identical resource creation instruction.

Thus, before creating a new resource its characteristics are compared with the characteristic of all the previously created and existing resources. If a previously created duplicate resource is found, having identical characteristics, it is used rather than creating a new resource.

Figure 2:
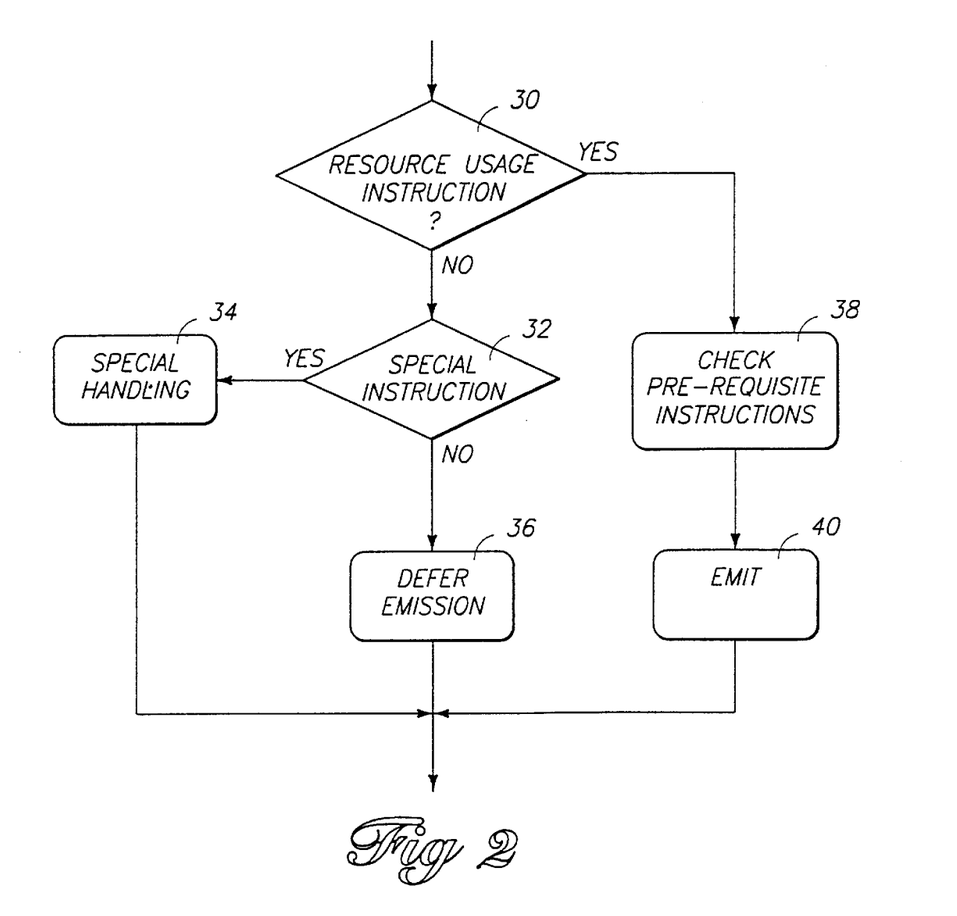
FIGS. 2-6 are flow charts illustrating preferred methods of optimizing a metafile in accordance with the invention.

FIG. 2 shows, in flow chart format, the general and preferred steps performed with respect to every encountered instruction from an original Windows® metafile 12. A first step 30 comprises determining whether the encountered instruction. If it is not, a step 32 is executed of determining whether the instruction falls within a particular category of instructions referred to herein as "special" instructions. This category of instruction is enumerated above. It includes instructions that require a special handling step 34, which will be explained in more detail, below. If the instruction is not a special instruction, execution flows to step 36. Step 36 comprises deferring emission of the instruction until some later time.

If it is determined in step 30 that the current instruction is a resource usage instruction, execution flows to step 38. Step 38 comprises checking for any prerequisite instructions and potentially emitting such prerequisite instructions. A prerequisite instruction is an instruction upon which the current instruction is dependent. Generally, a resource usage instruction will be dependent on one or more state modification instructions, including at least a resource selection instruction.

After step 38, a step 40 is executed comprising emitting the current resource usage instruction. Before emitting the resource usage instruction, however, its specified object index value must be changed to a value that is valid within the emitted metafile. This is generally the case with all resource-related instructions. In the original metafile, object index values are assigned to created resources using Windows® GDI rules. Optimization program 16 uses the same rules to assign object index values to resources created by encountered resource creation instructions. Object index values in the emitted metafile must be assigned using the same rules. How ever, deferring certain resource creation records and re-using already-created resources can result in different object index values being used in the original and emitted metafiles to refer to the same resources. Accordingly, a mapping is made when emitting resource-related instructions, from the object index value valid in the original metafile to the object index value valid in the emitted metafile. In other words, any object index value specified in an original instruction must be mapped to a corresponding value valid in the emitted metafile before actually emitting the instruction.

Figure 3:
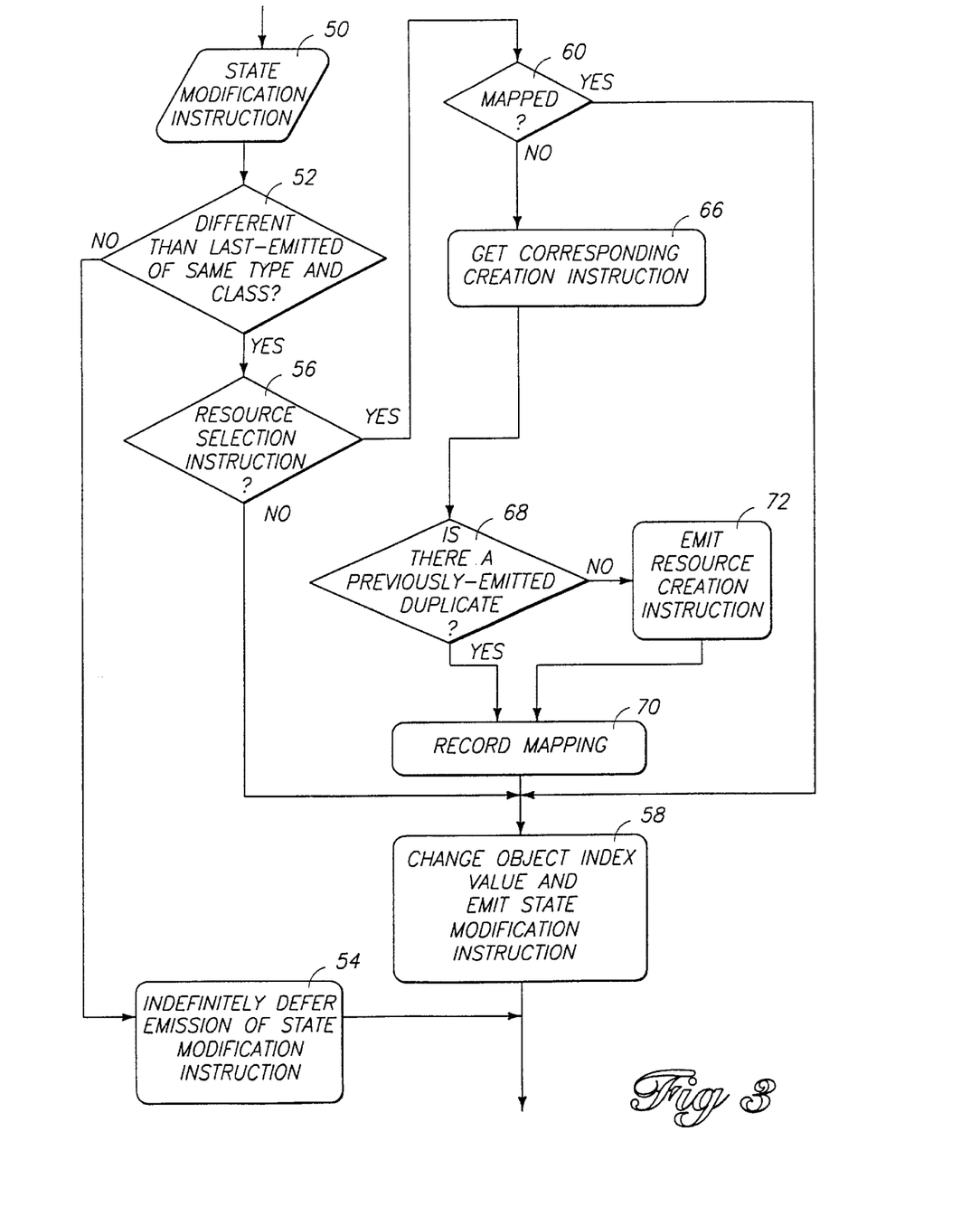

FIG. 3 shows the steps performed to accomplish step 38 of FIG. 2. The steps of FIG. 3 operate on every single prerequisite instruction identified in step 38 of FIG. 2. In the preferred embodiment described herein, a prerequisite instruction will be a current state modification instruction as indicated by block 50.

Step 52 of FIG. 3 comprises comparing state modification instruction 50 with the most recently emitted instruction of the same type. If the instruction is a resource selection instruction, it is compared against the most recently emitted resource selection instruction applying to the same resource class. For instance, if the resource selection instruction applies to the pen class, it is compared to the most recently emitted resource selection instruction applying to the pen class. If the comparison determines that the current instruction does not differ from the most recently emitted instruction of the same type or resource class, a step 54 is executed of indefinitely deferring emission of the current state modification instruction. In other words, the instruction is never emitted.

If the current instruction does differ from the most recently emitted instruction of the same type and class, a step 56 is executed of determining whether the state modification instruction is a resource selection instruction. If it is not, execution flows to step 58, comprising emitting the current state modification instruction.

If the state modification instruction is a resource selection instruction, execution flows to step 60. Step 60 comprises determining whether the particular resource identified by the object index value of the current resource selection instruction has been mapped to a corresponding object index value in the emitted metafile. If there exists such a mapping, execution flows to step 58, wherein the object index value of the current resource selection instruction is changed in accordance with the mapping. Step 58 also includes emitting the resource selection record when the changed object index value is emitted.

If no mapping exists, emission of the prerequisite resource creation instruction must have been deferred as a result of step 36 of FIG. 2. A step 66 is therefore performed of retrieving or looking up the deferred resource creation instruction. A step 68 is then performed of determining whether the retrieved resource creation instruction describes a resource with characteristics duplicating those of a resource that already exists. This will be the case if a previous resource creation instruction has been emitted specifying characteristics or parameters identical to those of the currently specified resource. If such a duplicate indeed exists, a step 70 is executed of recording a mapping the object index value of the current resource selection instruction to the object index value of the previously emitted duplicate resource creation instruction. Step 58 is then executed, comprising changing the object index value of the resource selection instruction in accordance with the mapping and emitting the resource selection instruction with the changed object index value.

If in step 68 it is determined that there is no previously existing resource matching the characteristics of the resource identified by the object index value of the current resource selection instruction, step 72 is executed of emitting the resource creation instruction that the current resource selection instruction is dependent upon. Execution then flows to step 70 to record a mapping from the original object index value to an emitted object index value, and then to step 58 for mapping and emission of the current resource selection instruction.

The "special" state modification instructions, listed above, are exceptions to the described rules and steps and are handled in a special way as indicated by block 34 of FIG. 2. These instructions include the GDI SAVEDC and RESTOREDC instructions. The SAVEDC instruction is a "push" instruction that saves the current state context on a special GDI stack. The state context is the combination of all state information—a set of the computer-maintained state variables. The RESTOREDC is a "pop" instruction that returns the GDI to the original or saved state context.

To correctly deal with SAVEDC and RESTOREDC instructions, optimization program 16 maintains its own context stacks: an "original" context stack corresponding to instructions encountered in the original metafile; and an "emitted" stack corresponding to instructions actually emitted. In the preferred embodiment herein, these stacks actually store instruction reports. When a SAVEDC instruction is encountered, the current original instruction report is saved on the original context stack. When a RESTOREDC instruction is encountered, the instruction report on the top level of the original context stack is restored as the current original instruction report. Similarly, when a SAVEDC instruction is emitted, the current emitted instruction report is stored on the emitted context stack. When a RESTOREDC instruction is emitted, the instruction report on the top level of the emitted context stack is restored as the current emitted instruction report.

Figure 4:
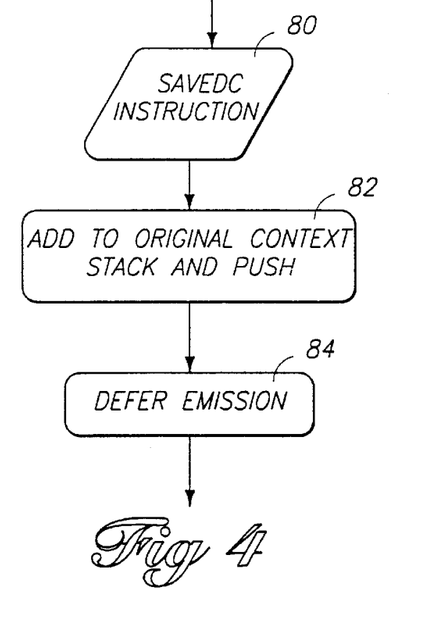

FIG. 4 shows how a SAVEDC instruction 80 is handled. Generally, SAVEDC emission is deferred at least until encountering one of the special instructions other than SAVEDC and RESTOREDC. However, an encountered SAVEDC instruction is added to the current original instruction report, along with an indication of whether the instruction has been emitted. In addition, a push operation is performed on the original context stack maintained by optimization program 16 before adding the SAVEDC instruction to the current instruction report. These steps are shown by blocks 82 and 84 of FIG. 4.

Figure 5:
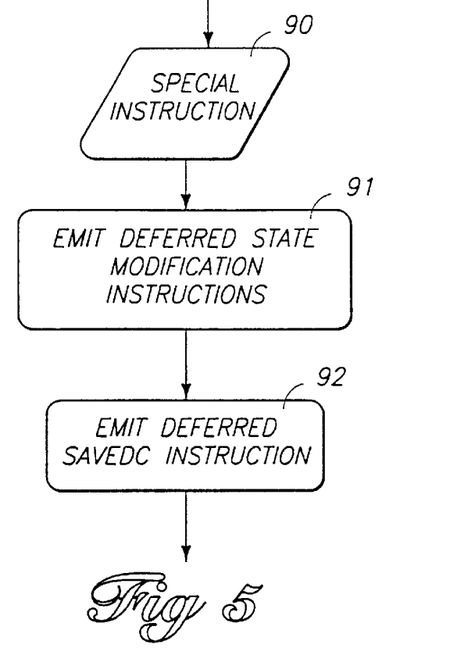

FIG. 5 shows how special instructions other than SAVEDC and RESTOREDC instructions are handled. Upon encountering a special instruction 90, a step 91 is performed of emitting all deferred state modification instructions in the current original instruction report. This step is accomplished by comparing the original instruction report to the emitted instruction report. For any instruction types that differ, the corresponding instruction from the original instruction report is emitted. In subsequent step 92 any deferred SAVEDC instruction is emitted and is marked in the original instruction report as being emitted rather than deferred. When a SAVEDC instruction is emitted, it is added to the emitted instruction report and a push operation is performed on the emitted context stack.

Figure 6:
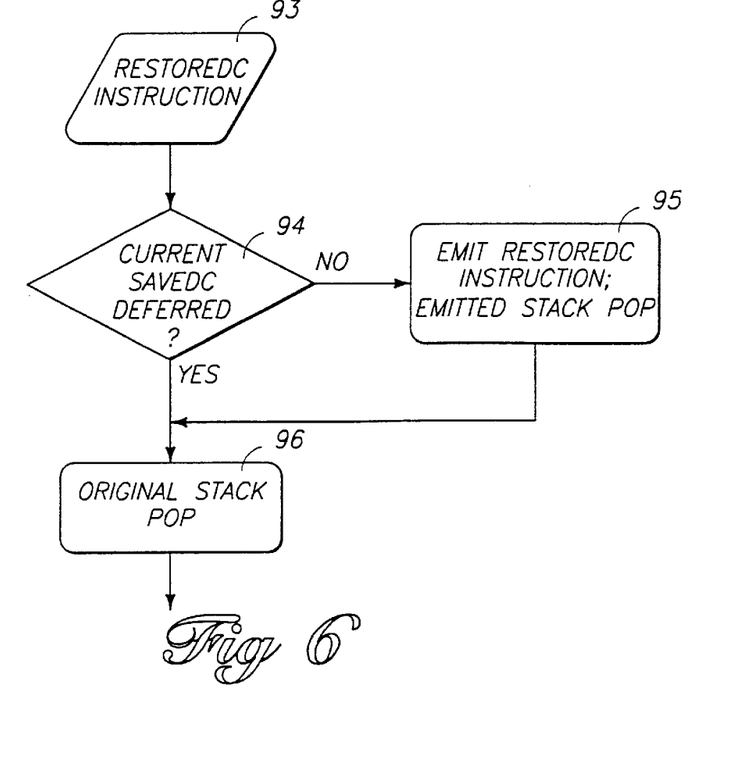

FIG. 6 shows how a RESTOREDC instruction 93 is handled. In step 94, the original instruction report is checked to see whether the SAVEDC instruction in the original instruction report has been deferred. If it has, the RESTOREDC instruction is discarded. Otherwise, a step 95 is performed, comprising emitting the RESTOREDC instruction, adding it to the emitted instruction report, and performing a pop operation on the emitted context stack. In either case, a step 96 is executed comprising a pop operation on the original context stack.

Palette-related instructions are also handled as an exception to the rules given above. All palette-related instructions other than CREATEPALETTE are emitted when encountered, after emitting any prerequisite instructions. CREATEPALETTE instructions are deferred until encountering instructions that are dependent on said CREATEPALETTE instructions.

The instruction handling and processing performed by optimization program 16 can be performed in many ways. In the preferred embodiment, all instruction records from the original metafile are initially read into memory so that they can be referenced by pointers. Duplicate instruction records are eliminated. This storage of metafile instruction records is referred to herein as an instruction dictionary. The ordering of records within the original metafile is recorded by a linked list, each entry of which has a pointer to one of the metafile records in the dictionary.

Figure 7:
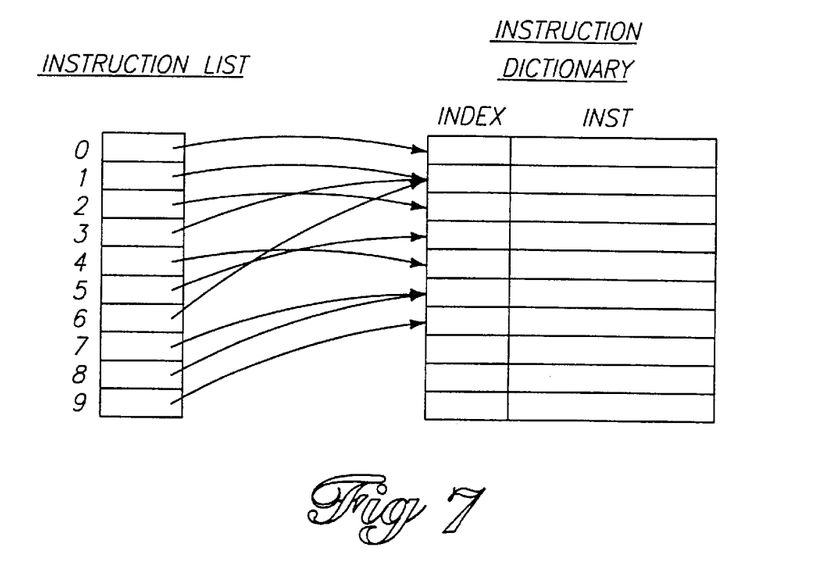
FIGS. 7-10 are block diagrams illustrating resource tracking structures and methods used in the preferred embodiment of the invention.

FIG. 7 illustrates the relationship of such a linked instruction list to an instruction dictionary. The instruction list is simply a sequence of pointers to entries in the instruction dictionary. Within the dictionary, each entry contains an instruction. Entries corresponding to resource creation instructions also have an associated index field. The use of the index field will be described below. Notice that more than one entry in the instruction list points to a single entry within the instruction dictionary. This happens when a metafile contains instructions that are identical to each other. Because duplicate entries are eliminated from the instruction dictionary, repeated identical instructions are represented by a single entry in the dictionary.

Because any instruction can be specified by a pointer, the instruction reports described above are structures containing pointers to relevant instructions. This simplifies storage and comparison requirements. To determine whether two instructions are identical, it is only necessary to compare the pointers to the instructions.

To eliminate emission of duplicate resource creation instructions, resources are tracked using two arrays—one tracking objects that would have existed under the original metafile and one tracking objects actually existing under the emitted metafile. The arrays take the following forms (in C++ syntax):

```
struct original_mru[cnt]        // Most recently used resources.
{
    long value;                 // Either the emitted object.
                                // index value or a free list index.
    CREATE_RECORD cr;           // Pointer to the record in the
                                // instruction dictionary containing
                                // the corresponding object creation
}                               // instruction.
struct emitted_mru[cnt]         // Most recently used resources.
{
    long value;                 // Free list index.
    CREATE_RECORD cr;           // Pointer to the record in the
                                // instruction dictionary containing
                                // the corresponding object creation
}                               // instruction.
```

The array original_mru has an entry for each resource existing under the original metafile, indexed by cnt, the object index value of the resource in the original metafile. The array emitted_mru has an entry for each resource existing in the emitted or optimized metafile, indexed by cnt, the object index value of the resource in the emitted metafile.

Figure 8:
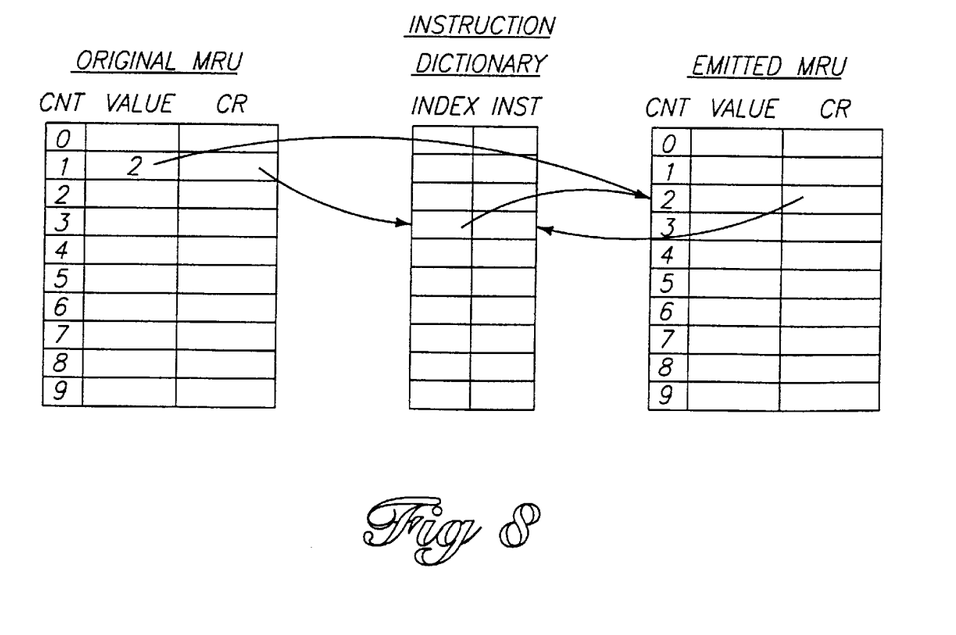

FIG. 8 shows the relationships between original_mru, emitted_mru, and the instruction dictionary. In original mru, the variable value normally maps an original object index value to an emitted object index value. For example, in FIG. 8 original object index value 1 is mapped to emitted object index value 2. Both original object index value 1 and emitted object index value 2 are associated with a resource created by a particular resource creation instruction. Variable cr, in both original_mru and emitted_mru, is a pointer to that particular resource creation instruction in the instruction dictionary. Note that in original_mru there might be any entries pointing to the same resource creation instruction in the instruction dictionary. This is not the case in emitted_mru, however since one of the optimization steps is to eliminate the emission of duplicate resource creation instructions.

The variable index in instruction dictionary 104 is intended to eventually equal the object index value of the corresponding resource in the emitted metafile. This is the relationship shown in FIG. 8.

Figure 9:
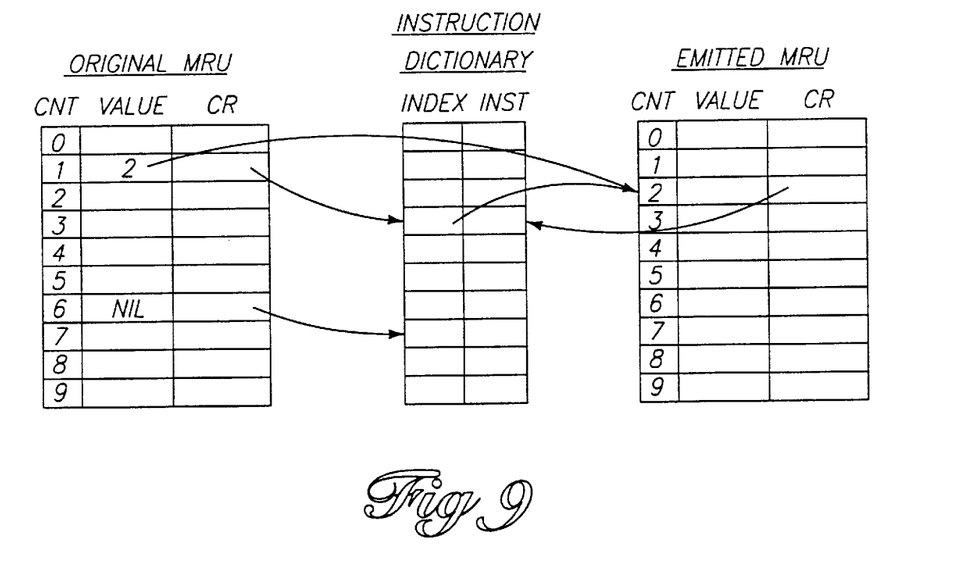

FIG. 9 shows the creation of a new entry in original_mru. This happens upon encountering a resource creation instruction in the original metafile. Suppose in this case that the next free object index value in the original metafile is 6. For this entry in original_mru, value is initially set to NIL, indicating that there is no currently identified mapping to the specified resource in the emitted metafile. Pointer cr is set to point to the encountered resource creation instruction in the instruction dictionary. Actual emission of the resource creation instruction is deferred. No instructions are emitted as a result of encountering the resource creation instruction.

Suppose now that a resource selection instruction and a corresponding resource usage instruction are encountered, specifying an object index value of 6. At this point, object index value 6, which is valid within the original metafile, needs to be mapped to an object index value that is valid in the emitted metafile. Since value in original_mru is NIL, a mapping must be supplied. To do this, optimization program 16 first checks to see whether the instruction pointed to by cr has been emitted. If it has, the instruction dictionary index field corresponding to the instruction will point to an entry in emitted_mru, and this entry in emitted_mru will have a cr that points right back to the same instruction dictionary entry. If this condition is true, cr in original_mru is set to equal the index field from the instruction dictionary.

Figure 10:
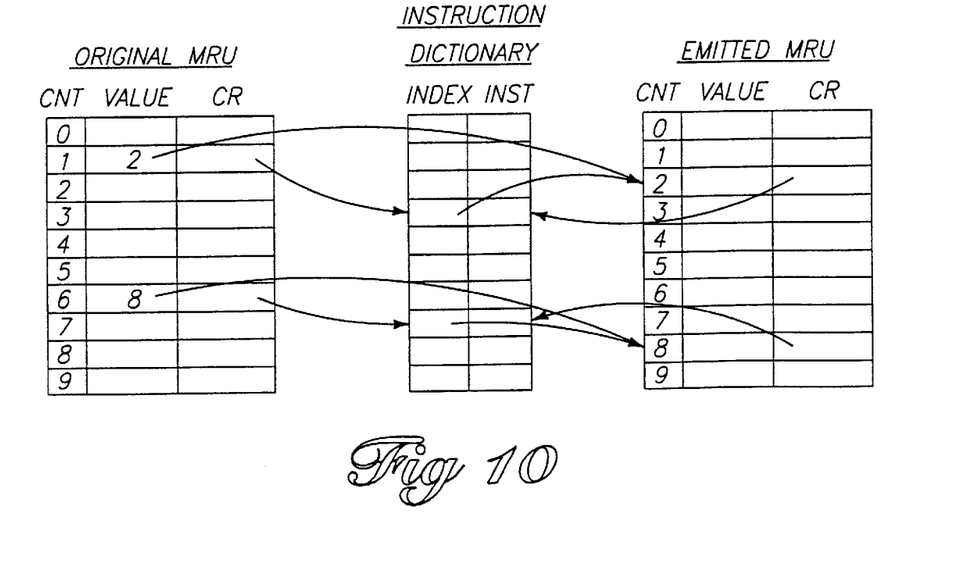

If the condition is not true, and the instruction pointed to by cr has not been emitted, it is emitted at this time and added to emitted_mru. As shown in FIG. 10, it is added in the example case at emitted object index value 8. The cr field within emitted_mru is set to the same value as cr within original_mru, and index in the instruction dictionary is set to point to the newly created entry in emitted_mru. The next time reference is made to a reference having an original object index value of 6, it will be mapped to an emitted object index value of 8 by simply referencing the value field of original_mru.

At least in the emitted metafile, the object index values of deleted resources must be tracked. To accomplish this, a variable is maintained with a pointer to the original_mru entry of the last deleted resource. This entry, in turn, has a cr that points to the original_mru entry of the next most recently deleted resource. As new resources are created in the original metafile, the object index values are re-used in the reverse order of their deletion in accordance with GDI rules.

Implementing the described invention greatly reduces the number of instructions in the optimized metafile as compared to the original metafile. The optimized metafile is therefore smaller and executes more quickly than the original metafile while producing exactly the same drawing results. Further reductions in the size of the metafile can be achieved through conventional compression techniques, and by further compression techniques described in a U.S. Patent Application entitled "Metafile Compression" by inventor Gordon T. Whitten, filed concurrently herewith. This other patent application is incorporated by reference herein.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A computer-implemented method for emitting instructions from a sequence of instructions having an original order, said instructions including state modification instructions applying to different computer-maintained state information, the method comprising the following steps:

stepping through the sequence of instructions so that the instructions are encountered in their original order;

upon encountering a particular state modification instruction applying to a particular state information, deferring emission of said state modification instruction at least until encountering a subsequent instruction that is dependent on said particular state information.

2. A method as recited in claim 1 and further comprising the following additional steps:

keeping track of the most recently emitted state modification instruction applying to said particular state information;

upon encountering said subsequent instruction that is dependent on said particular state information, emitting said particular state modification instruction if and only if it differs from the most recently emitted state modification instruction applying to said particular state information.

3. A computer-implemented method for emitting instructions from a sequence of instructions having an original order, said instructions being members of an instruction set used in conjunction with dynamically created computer resources having specified characteristics, said instruction set including resource creation instructions, resource selection instructions, resource usage instructions, and resource deletion instructions, the method comprising the following steps:

stepping through the sequence of instructions so that the instructions are encountered in their original order;

upon encountering any particular resource creation instruction, deferring its emission at least until encountering a resource selection instruction that is dependent on said particular resource creation instruction;

upon encountering any particular resource selection instruction, deferring its emission at least until encountering a particular resource usage instruction that is dependent on said particular resource selection instruction.

4. A method as recited in claim 3 and further comprising indefinitely deferring emission of resource deletion instructions.

5. A method as recited in claim 3 wherein each resource creation instruction specifies resource characteristics, the method further comprising the following additional steps:

indefinitely deferring emission of resource deletion instructions;

upon encountering an individual resource creation instruction, indefinitely deferring its emission if it specifies resource characteristics identical to those of a previously-emitted resource creation instruction.

6. A method as recited in claim 3, wherein said instruction set includes state modification instructions applying to different computer-maintained state information, the method further comprising the following additional step:

upon encountering a state modification instruction applying to particular state information, deferring emission of said state modification instruction at least until encountering a subsequent instruction that is dependent on said particular state information.

* * * * *